US010036802B2

(12) United States Patent
Autran (10) Patent No.: US 10,036,802 B2
(45) Date of Patent: Jul. 31, 2018

(54) AUTOMOTIVE VEHICLE EQUIPMENT INTEGRATING A DEVICE FOR MEASURING DISTANCE OF OBJECTS

(71) Applicant: Valeo Systemes Thermiques, Le Mesnil Saint Denis (FR)

(72) Inventor: Frédéric Autran, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 184 days.

(21) Appl. No.: 14/917,593

(22) PCT Filed: Sep. 8, 2014

(86) PCT No.: PCT/FR2014/000203
§ 371 (c)(1),
(2) Date: May 6, 2016

(87) PCT Pub. No.: WO2015/033036
PCT Pub. Date: Mar. 12, 2015

(65) Prior Publication Data
US 2016/0274220 A1    Sep. 22, 2016

(30) Foreign Application Priority Data

Sep. 9, 2013 (FR) ..................... 13 02108

(51) Int. Cl.
*G01C 3/08* (2006.01)
*G01S 7/481* (2006.01)
(Continued)

(52) U.S. Cl.
CPC ............ *G01S 7/4814* (2013.01); *G01S 17/89* (2013.01); *G01S 17/936* (2013.01)

(58) Field of Classification Search
CPC .... G01S 7/4814; G01S 7/4813; G01S 17/936; G01S 17/89
(Continued)

(56) References Cited

U.S. PATENT DOCUMENTS 8,779,443 B2 * 7/2014 Wong ................... H01L 25/167
257/84
2002/0008876 A1    1/2002 Terui et al.
(Continued)

FOREIGN PATENT DOCUMENTS

DE            10153977 A1    5/2003

OTHER PUBLICATIONS

Internatianal Search Report issued in corresponding application No. PCT/FR2014/000203 dated Dec. 5, 2014 (6 pages).
(Continued)

*Primary Examiner* — Mark Hellner
(74) *Attorney, Agent, or Firm* — Osha Liang LLP (57) ABSTRACT

Automotive vehicle equipment integrating a device for measuring distances of objects situated in the field of detection of the device, the device comprising: at least one light emitter configured to emit light rays according to an emission field, a light receiver disposed outside the emission field of the emitter and configured to receive light rays according to a reception field corresponding to the detection field of the device, a means for measuring the travel time of the light rays between the emitter and the receiver, the equipment comprising at least one element preventing the reflection of the light rays issuing from the light emitter on the exterior of the equipment.

19 Claims, 5 Drawing Sheets

(51) Int. Cl.
*G01S 17/89* (2006.01)
*G01S 17/93* (2006.01)
(58) Field of Classification Search
USPC .......................................................... 356/4.01
See application file for complete search history.

(56) References Cited

U.S. PATENT DOCUMENTS

2005/0201096 A1   9/2005   Terui
2009/0059766 A1   3/2009   Yamada

OTHER PUBLICATIONS

Written Opinion of the International Searching Authority issued in corresponding application No. PCT/FR2014/000203 dated Dec. 5, 2014 (7 pages).

* cited by examiner

AUTOMOTIVE VEHICLE EQUIPMENT INTEGRATING A DEVICE FOR MEASURING DISTANCE OF OBJECTS

The present invention especially relates to the field of pieces of equipment for automotive vehicles, comprising a device for measuring the distance of objects located in the detection field of said device.

The ability to measure the distance of objects located in a given detection field has many applications in the automotive field.

Devices of the time-of-flight (TOF) video camera type, operating on the principle of measurement of time-of-flight and allowing 3-D images of a scene located in the field of the video camera to be obtained, already exist.

This type of device allows, for each point of the scene located in the field of the video camera, information to be obtained on the distance to the video camera.

Typically, this type of device comprises a light emitter illuminating the scene located in the field of the video camera and a light receiver placed so as to receive light rays from the field of the video camera.

The distance between the video camera and an object located in the field of the video camera is determined by illuminating the object with at least one light pulse emitted by the emitter. The travel time between the object and the receiver allows the distance between this object and the video camera to be determined.

This type of measurement may be carried out pixel by pixel at the detector level thus allowing a three-dimensional image of the scene located in the field of the video camera to be obtained.

The use of this type of device in pieces of automotive equipment allows, inter alia, gestures to be recognized or even distances between the vehicle and exterior objects to be measured.

For reasons of aesthetics and lifetime, it is preferable for these devices to be integrated into the piece of automotive equipment. In other words, it is preferable for these devices to be located back from the exterior surfaces of the piece of automotive equipment.

However, the integration of this type of device into pieces of equipment for automotive vehicles is not without difficulty. In particular, the inventors have observed that once integrated into a piece of automotive equipment, the results of these TOF video cameras may be corrupted. Specifically, the images obtained may exhibit a proximity noise masking the objects of the scene located in the detection field.

Thus, there is a need to develop a piece of automotive equipment equipped with a device for measuring distance not having the disadvantages of prior-art devices.

For this purpose, according to a first aspect, one subject of the invention is a piece of equipment, especially for an automotive vehicle, incorporating a device for measuring the distance of objects located in the detection field of the measuring device,
the measuring device comprising:
at least one light emitter configured to emit light rays in an emission field;
a light receiver placed outside of the emission field of the emitter and configured to receive light rays from a reception field corresponding to the detection field of the device; and
a means for measuring the journey time of the light rays between the emitter and the receiver,
the piece of equipment comprising at least one element preventing the reflection of light rays issued from the light emitter from the exterior surfaces of the piece of equipment.

Advantageously, the presence of the element preventing the reflection of light rays issued from the light emitter from the exterior surfaces of the piece of equipment allows proximity noise to be suppressed. Thus, the performance of the distance detector integrated into the piece of automotive equipment is greatly improved.

The piece of equipment according to the invention may also comprise one or more of the following features, considered individually or in any technically possible combination:
the element preventing the reflection of light rays issued from the light emitter comprises a diaphragm placed in front of the light emitter so as to prevent the tight rays issued from the light emitter from illuminating the surfaces of the piece of equipment; and/or
the diaphragm is a metal diaphragm; and/or
the diaphragm has a thickness larger than or equal to 0.1 mm and smaller than or equal to 0.5 mm; and/or
the aperture of the diaphragm has substantially the same shape as the light receiver; and/or
the edges of the aperture of the diaphragm are beveled so as to limit the reflection of rays issued from the light emitter from said edges; and/or
the light emitter is configured so as to emit light pulses; and/or
the light emitter is a laser diode or an LED emitting in the infrared; and/or
the piece of equipment comprises a plurality of light emitters and comprises in front of each light emitter a diaphragm; and/or
the piece of equipment comprises in front of said at least one emitter a lens; and/or
the piece of equipment comprises at least one diaphragm between the emitter and the lens; and/or
the piece of equipment comprises at least one first diaphragm between the emitter and the lens and a second diaphragm on the other side of the lens; and/or
the first diaphragm is made of metal and the second diaphragm is made of plastic covered with an absorbent material; and/or
the element preventing the reflection of light rays issued from the light emitter comprises an antireflection coating placed on at least one portion of the surfaces of the piece of equipment; and/or
the antireflection coating is specifically adapted to prevent the reflection of light rays at the wavelengths of the light rays emitted by the at least one light emitter.

The invention also relates to a device for measuring the distance of objects located in the field of detection of the device, the device comprising:
at least one light emitter configured to emit light rays in an emission field;
a light receiver placed outside of the emission field of the emitter and configured to receive light rays from a reception field corresponding to the detection field of the device; and
a means for measuring the journey time of the light rays between the emitter and the receiver;
the detector furthermore comprises at least one diaphragm placed in front of the light emitter limiting the emission field so that the only light rays issued from the light emitter illuminating the reception field of the light receiver are the rays directly issued from the emitter.

The device according to the invention may also comprise one or more of the following features, considered individually or in any technically possible combination;

the diaphragm and the emitter are configured so that all the light rays issued from the light emitter directly illuminate the reception cone of the light receiver; and/or the diaphragm is a metal diaphragm; and/or the diaphragm has a thickness larger than or equal to 0.1 mm and smaller than or equal to 0.5 mm; and/or the aperture of the diaphragm has substantially the same shape as the light receiver; and/or the edges of the aperture of the diaphragm are beveled so as to limit the reflection of rays issued from the light emitter from said edges; and/or the light emitter is configured so as to emit light pulses; and/or the light emitter is a laser diode or an LED emitting in the infrared; and/or the piece of equipment comprises a plurality of light emitters and comprises, in from of each light emitter a diaphragm; and/or the piece of equipment comprises in front of said at/east one emitter a lens; and/or the piece of equipment comprises at least one diaphragm between the emitter and the lens; and/or the piece of equipment comprises at least one first diaphragm between the emitter and the lens and a second diaphragm on the other side of the lens; and/or the first diaphragm is made of metal and the second diaphragm is made of plastic covered with an absorbent material.

Figure 1:
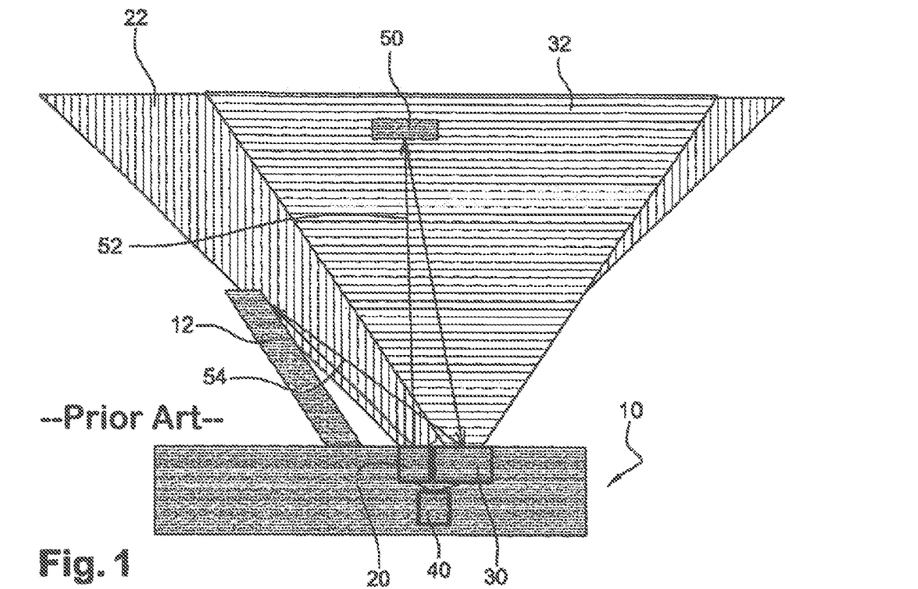
FIG. 1 is a schematic representation of a piece of automotive vehicle equipment incorporating a device for measuring distance in the absence of an antireflection element.

The invention will be better understood in light of the following description, which is given merely by way of indication, does not have the intention of limiting said invention, and is accompanied by the following figures:

FIG. 1 illustrates a piece of automotive vehicle equipment 10 incorporating a measuring device. The measuring device allows the distances of objects located in the detection field of the device to be measured.

As shown in FIG. 1, the measuring device comprises a light emitter 20, a light detector 30 and a means 40 for measuring the journey time of light rays between the light emitter 20 and the light receiver 30.

The light emitter 20 emits light rays in a emission field represented by the vertically hatched zone 22 in FIG. 1.

The light receiver 30 is placed outside of the emission field 22 of the light emitter 20, in other words, the light receiver 30 is not directly illuminated by the light emitter 20. For example, the light emitter 20 and the light receiver 30 are placed substantially in the same plane.

The light receiver 30 is configured, by way of its dimensions and possibly the use of optical lenses, to receive light rays from a reception field 32 represented by the horizontally hatched zone in FIG. 1.

The measurement of the distance between the measuring device and an object 50 located in the detection field of the device is carried out by means of the measurement of the journey time of a light ray 52 between the emitter 20 and the receiver 30. The light ray 52 is received by the light receiver 30 after having been emitted by the emitter 20 and reflected by the object 50.

As illustrated in FIG. 1, when a portion 12 of the piece of equipment 10 is located in the emission field 22 of the light emitter 20, at least some of the light rays issued from the emitter are reflected back toward the light receiver 30. These light rays 54 originating from objects located outside of the reception field 32 are called parasitic rays.

At the level of the light receiver 30, the signal corresponding to the parasitic rays adds to the signal corresponding to the rays reflected by objects located in the reception field.

The journey times of the parasitic rays are generally much shorter than the journey times of the rays reflected by the objects located in the reception field 32. In addition, the light intensity of these parasitic rays is generally higher than the light intensity of the rays reflected by the objects located in the reception field 32 because of their shorter journey time and the smaller distance to the receiver.

Thus, it is not possible at the level of the signal received by the receiver to distinguish the signal corresponding to the parasitic rays from that corresponding to rays reflected by objects located in the reception field.

The parasitic rays are the root cause of the proximity noise that the inventors observed when integrating TOF type video cameras into pieces of automotive vehicle equipment.

Figure 2:
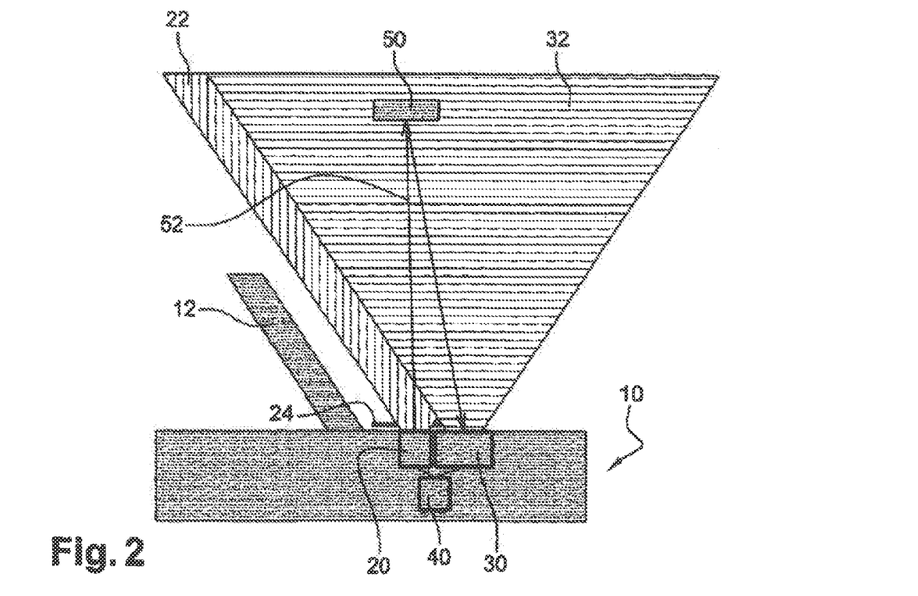
FIG. 2 is a schematic representation of a piece of automotive vehicle equipment according to a first embodiment.

FIG. 2 schematically shows a piece of automotive vehicle equipment according to a first embodiment of the invention.

According to this first embodiment, the piece of automotive vehicle equipment 1 comprises and for example incorporates a measuring device. The measuring device allows the distances of objects located in the detection field of the device to be measured.

As for the device in FIG. 1, the measuring device comprises a light emitter 20, a light detector 30 and a means 40 for measuring the journey time of light rays between the light emitter 20 and the light receiver 30.

The light emitter 20 emits light rays in an emission field represented by the vertically hatched zone 22 in FIG. 2.

The light receiver 30 is placed outside of the emission field 22 of the light emitter 20. In other words, the light receiver 30 is not directly illuminated by the light emitter 20. For example, the light emitter 20 and the light receiver 30 are placed substantially in the same plane.

The light receiver 30 is configured, by way of its dimensions and possibly the use of optical lenses, to receive light rays from a reception field 32 represented by the horizontally hatched zone in FIG. 2.

The measurement of the distance between the measuring device and an object 50 located in the detection field of the device is carried out by means of the measurement of the journey time of a light ray 52 between the emitter 20 and the receiver 30. The light ray 52 is received by the light receiver 30 after having been emitted by the emitter 20 and reflected by the object 50.

In order to eliminate the parasitic rays originating from the reflection from the portion 12 of the piece of equipment 10, said piece of equipment comprises a diaphragm 24 placed in front of the light emitter 20 so as to prevent the light rays issued from the light emitter 20 from eliminating the portion 12. The diaphragm 24 is configured and placed in front of the emitter so as to decrease the emission field 22. Thus, the portion 12 of the piece of equipment is not illuminated by the emitter 20, so that no light ray issued from the light emitter 20 can reflect directly from the portion 12 and be received by the light receiver 30.

Figure 3A:
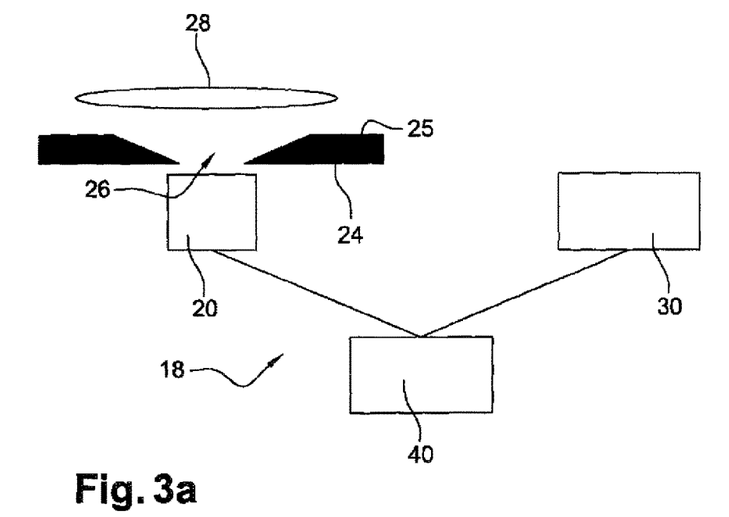
FIGS. 3a to 3c are schematic representations of devices for measuring distance according to various embodiments of the invention.

An exemplar measuring device able to be incorporated into a piece of equipment according to the invention is shown in FIG. 3a.

The measuring device shown in FIG. 3a comprises as light emitter 20, a light receiver 30 and a means 40 for measuring the journey time of light rays between the emitter 20 and the receiver 30.

The light emitter is preferably configured so as to emit light pulses. Advantageously, this facilitates the measurement of the journey time of the light rays between the emitter 20 and the receiver 30.

The light emitter may be a laser diode or even an LED emitting in the infrared. Advantageously, this facilitates the identification at the receiver level of light rays issued from the emitter and nighttime use.

A diaphragm 24 is placed in front of the light emitter 20 in order to limit the field of emission 22 of the light emitter 20.

According to one aspect of the invention, the diaphragm 24 is placed so that the only light rays issued from the light emitter 20 and that illuminate the reception field 32 are rays directly issued from the emitter 20. In other words, the only light rays issued from the light emitter 20 and that illuminate the reception field 32 have not been reflected before reaching the reception field 32.

According to another aspect of the invention, the diaphragm and the emitter are configured so that all the light rays issued from the light emitter directly illuminate the reception field 32.

The shape and/or size of the aperture 26 are defined by a person skilled in the art, for example by optical simulation, so as to prevent the light rays issued from the light emitter from illuminating the surfaces of the piece of equipment, by limiting the emission field 22.

According to one embodiment, the shape of the aperture 26 of the diaphragm 24 is substantially the same as that of the light receiver 30. Furthermore, when the shape of the light receiver 30 is not axisymmetric, it is preferable for the aperture 26 to have substantially the same orientation about the axis perpendicular to the plane of the diaphragm as that of the light receiver 30.

In order to ensure the diaphragm has a high opacity, in particular to infrared radiation, it is preferable for the diaphragm 24 to be made of metal.

The thickness of the diaphragm 24 must be sufficient to block the light rays issued from the emitter. The thickness of the diaphragm 24 must not be too large in order to limit the risk of reflection of the light rays issued from the emitter at the edges of the aperture of the diaphragm.

The inventors have determined that a thickness larger than or equal to 0.1 mm and smaller than or equal to 0.5 mm allows a good compromise to be obtained between opacity, reflection from the edges of the aperture and the cost of the diaphragm.

In order to limit the risk of reflection from the edges of the aperture of the diaphragm, it is possible, as shown in FIG. 3a, two make provision for the edges of the aperture to be beveled.

As shown in FIG. 3a, it is possible to provide a lens 28 placed after the diaphragm 24.

Figure 3B:
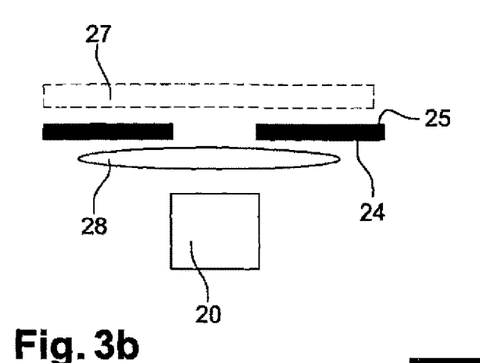

As shown in FIG. 3b, it is possible to provide a lens 28 placed in front of the diaphragm 24 and a transparent protective window 27.

Figure 3C:
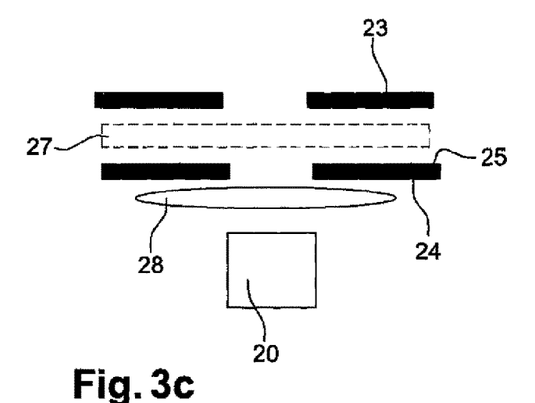

As shown in FIG. 3c, a second diaphragm 23 may be placed after the lens 28. This second diaphragm may be made of a less expensive material than the first diaphragm 24, for example of plastic covered with a material that absorbs infrared radiation.

The light receiver 30 is placed substantially in the same plane as the emitter 20. The light receiver generally comprises an array of pixels capable of receiving light rays and of converting them into an electrical signal.

The electrical signals produced by the receiver are transmitted and interpreted at the level of the mean of the measurement of the journey time of the light rays between the emitter and the receiver.

Figure 4A:
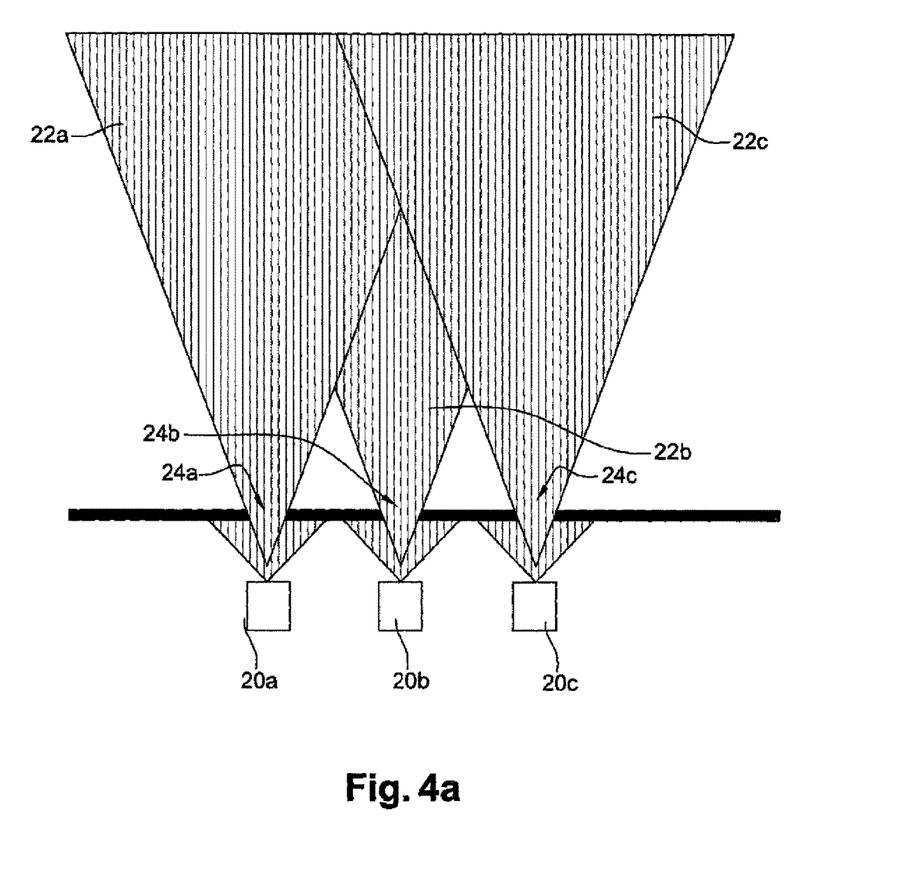
FIGS. 4a and 4b are schematic representations of devices for measuring distance according to two embodiments of the invention.

According to one embodiment shown in FIG. 4a, the measuring device may comprise a plurality of light emitters 20a, 20b, 20c. Diaphragms 24a, 24b, 24c are placed in front of each of the light emitters so as to limit the emission fields 22a, 22b, 22c of each of the emitters 20a, 20b, 20c.

Figure 4B:
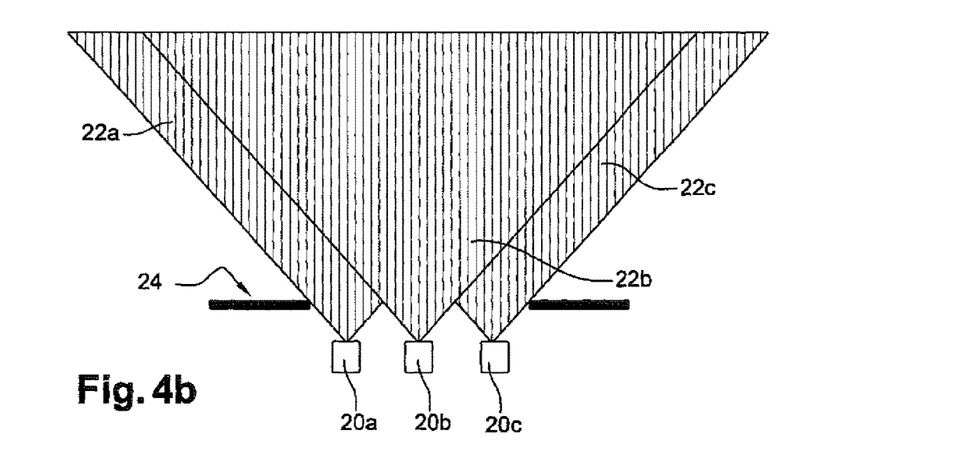

According to one embodiment shown in FIG. 4b, the measuring device may comprise a plurality of light emitters 20a, 20b, 20c. A single diaphragm 24 is placed in front of the set of light emitters so as to limit the emission fields 22a, 22b, 22c of each of the emitters 20a, 20b, 20c. as shown in FIG. 5, the element preventing the reflection of light rays issued from the emitter from the surfaces of the piece of equipment may also be an antireflection coating 14 placed on at least one portion of the surfaces of the piece of equipment.

Preferably, the antireflection coating is specifically adapted to prevent the reflection of light rays at the wavelengths of the light rays emitted by the emitter 20.

Figure 5:
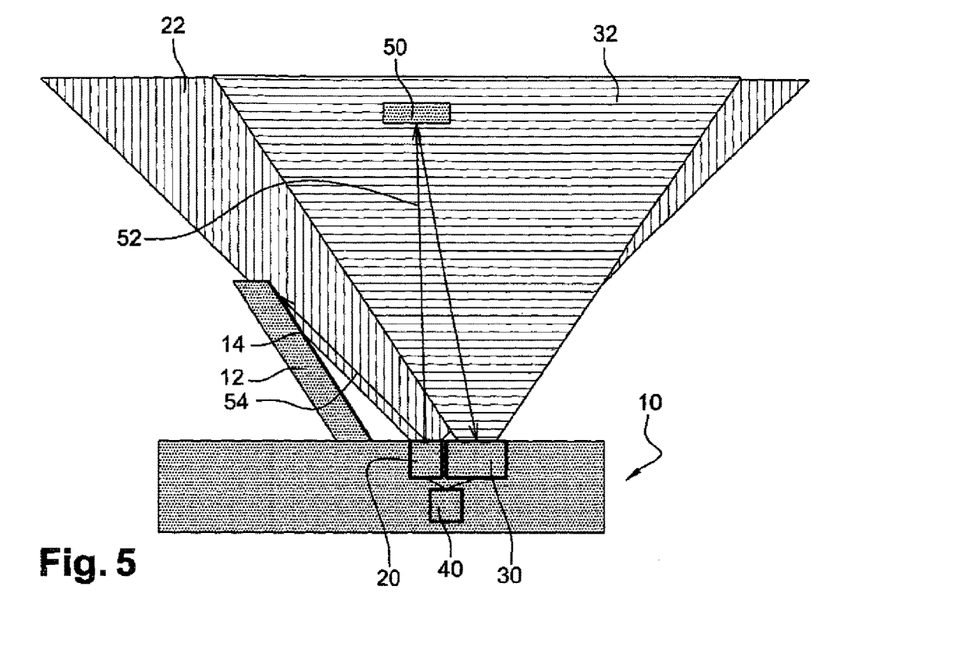
FIG. 5 is a schematic representation of a piece of automotive vehicle equipment according to a second embodiment.

As illustrated in FIG. 5, the emission field 22 is not decreased, but the light rays issued from the emitter illuminating the portions of the piece of equipment covered with the antireflection coating 14 are not reflected. The receiver therefore does not receive parasitic rays, thus improving the quality of the distance measurements carried out by the device integrated into the piece of equipment.

Advantageously, use of an antireflection coating allows a conventional measuring device to be used without having to equip it with a diaphragm.

However, it is envisionable to combine these two solutions, by using a measuring device comprising a diaphragm in front of the emitter and by covering at least one portion of the surfaces of the piece of equipment with an antireflection coating.

It is also envisionable to cover with an antireflection coating the surface of the diaphragm facing the emitter. Advantageously, this allows parasitic reflection to be further decreased.

Figure 6:
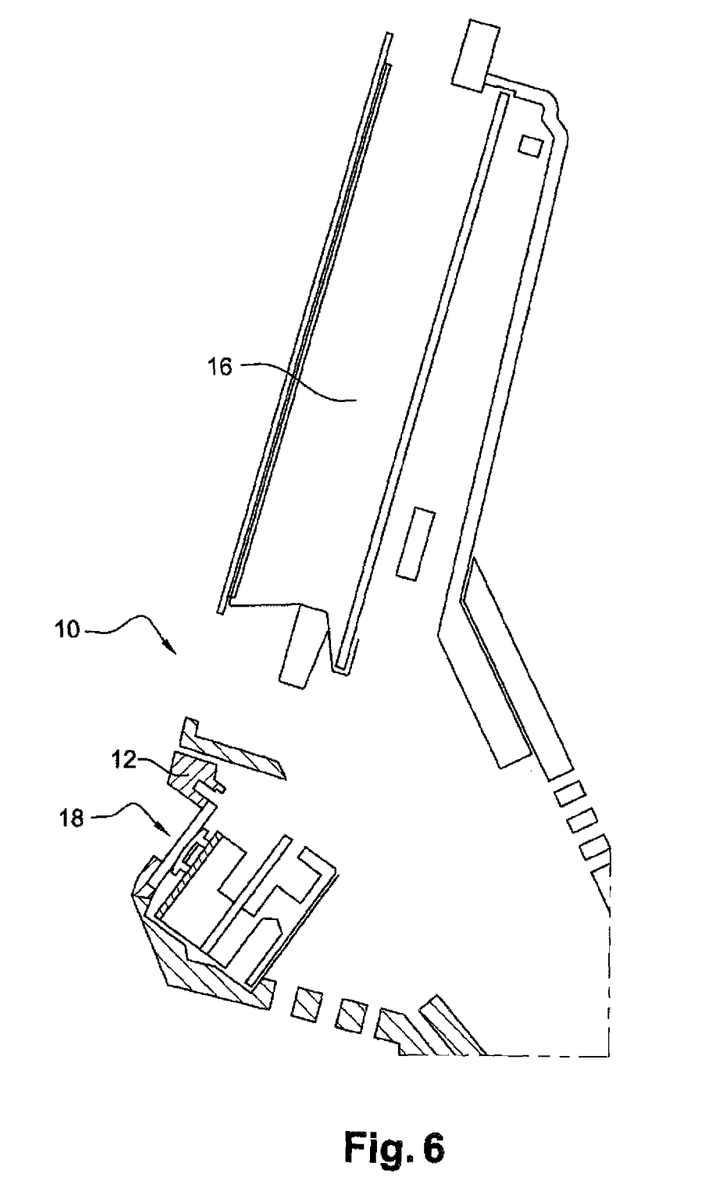
FIG. 6 is a representation of an exemplary piece of automotive vehicle equipment according to the invention.

The piece of automotive vehicle equipment according to the invention may for example be an LCD or TFT screen integrated into a dashboard, as illustrated in FIG. 6.

The piece of automotive vehicle equipment 10 shown in FIG. 6 comprises a measuring device 18 and a display screen 16.

As shown in FIG. 6, the measuring device 18 is integrated into the piece of equipment 10 and, in particular, portions 12 of the piece of equipment may be in the emission field of the measuring device 18. The device 18 integrated into the piece of equipment 10 comprises a diaphragm in front of the light emitter in order to limit the emission field of the emitter.

Thus none of the portions 12 of the piece of equipment 10 is illuminated by the emitter of the measuring device 18.

The measuring device 10 may allow movements made by the user to be determined in order to control the display on the display screen 16.

The piece of automotive vehicle equipment according to the invention is not limited to the example in FIG. 6, and may for example be:
- a control panel, for example furthermore allowing the air conditioning or the audio system of the vehicle to be controlled, the measuring device possibly being used to detect control gestures without user contact; and/or
- an LCD or TFT screen; and/or
- an HUD; and/or
- a dashboard; and/or
- an interior roof light; and/or
- a radar for detecting pedestrians placed for example on the exterior of the automotive vehicle; and/or
- a TOF type video camera the housing of which could be located in the emission field of the emitter.

The invention was described above using exemplary embodiments, without limiting the general inventive concept.

The exemplary embodiments are given merely by way of illustration and are not intended to limit the scope of the invention, which is defined solely by the appended claims.

In the claims, the word "comprising" does not exclude other elements and the indefinite article "a" does not exclude a plurality. The simple fact that the various features are defined in various dependent claims does not mean that a combination of these elements cannot advantageously be used. The reference signs in the claims must not be interpreted as limiting the scope of the invention.

The invention claimed is:

1. A piece of equipment for an automotive vehicle, incorporating a device for measuring the distance of objects located in the detection field of the device, the device comprising:
   at least one light emitter configured to emit light rays in an emission field;
   a light receiver placed outside of the emission field of the emitter and configured to receive light rays from a reception field corresponding to the detection field of the device;
   a means for measuring the journey time of the light rays between the emitter and the receiver; and
   at least one element preventing the reflection of light rays issued from the light emitter from the exterior surfaces of the piece of equipment.

2. The piece of equipment as claimed in claim 1, in which the at least one element preventing the reflection of light rays issued from the light emitter comprises a diaphragm placed in front of the light emitter so as to prevent the light rays issued from the light emitter from illuminating the surfaces of the piece of equipment.

3. The piece of measuring equipment as claimed in claim 2, in which the diaphragm is a metal diaphragm.

4. The piece of equipment as claimed in claim 2, in which the diaphragm has a thickness larger than or equal to 0.1 mm and smaller than or equal to 0.5 mm.

5. The piece of equipment as claimed in claim 2, in which the aperture of the diaphragm has substantially the same shape as the light receiver.

6. The piece of equipment as claimed in claim 2, in which the edges of the aperture of the diaphragm are beveled so as to limit the reflection of rays issued from the light emitter from said edges.

7. The piece of equipment as claimed in claim 1, in which the light emitter is configured so as to emit light pulses.

8. The piece of equipment as claimed in claim 1, in which the light emitter is a laser diode or an LED emitting in the infrared.

9. The piece of equipment as claimed in claim 2, further comprising a plurality of light emitters and a diaphragm in front of each light emitter.

10. The piece of equipment as claimed in claim 1, further comprising a lens in front of said at least one emitter.

11. The piece of equipment as claimed in claim 10, further comprising at least one first diaphragm between the emitter and the lens and a second diaphragm on the other side of the lens.

12. The piece of equipment as claimed in claim 11, in which the first diaphragm is made of metal and the second diaphragm is made of plastic covered with an absorbent material.

13. The piece of equipment as claimed in claim 1, in which the at least one element preventing the reflection of light rays issued from the light emitter comprises an anti-reflection coating placed on at least one portion of the surfaces of the piece of equipment.

14. The piece of equipment as claimed in claim 13, in which the antireflection coating is specifically adapted to prevent the reflection of light rays at the wavelengths of the light rays emitted by the at least one light emitter.

15. A device for measuring the distance of objects located in the field of detection of the device, the device comprising:
   at least one light emitter configured to emit light rays in an emission field;
   a light receiver placed outside of the emission field of the emitter and configured to receive light rays from a reception field corresponding to the detection field of the device;
   a means for measuring the journey time of the light rays between the emitter and the receiver; and
   at least one diaphragm placed in front of the light emitter limiting the emission field so that the only light rays issued from the light emitter illuminating the reception field of the light receiver are the rays directly issued from the emitter.

16. The device as claimed in claim 15, in which the diaphragm and the emitter are configured so that all the light rays issued from the light emitter directly illuminate the reception cone of the light receiver.

17. The device as claimed in claim 15, wherein the at least one light emitter emits light rays in an incoherent emission field.

18. The device as claimed in claim 15, wherein the light receiver placed outside of the emission field of the emitter receives light rays from an incoherent reception field corresponding to the detection field of the device.

19. A method for an automotive vehicle, incorporating a device for measuring the distance of objects located in the detection field of the device comprising at least one light emitter, a light receiver, a means for measuring a journey time of light rays and at least one element that prevents reflection of light rays, said method comprising:
   emitting light rays in an emission field by the emitter;
   receiving light rays from a reception field corresponding to a detection field of the device by the light receiver;
   measuring the journey time of the light rays between the emitter and the receiver by the means for measuring; and preventing the reflection of light rays issued from the light emitter from exterior surfaces by the element that prevents reflection.

* * * * *